(12) United States Patent
Maehashi et al.

(10) Patent No.: US 6,587,641 B1
(45) Date of Patent: Jul. 1, 2003

(54) APPARATUS FOR SIMULTANEOUSLY WRITING AND OUTPUTTING DATA STREAM

(75) Inventors: Takenori Maehashi, Osaka-fu (JP); Mitsuaki Morita, Osaka-fu (JP); Nobuyuki Enoki, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/694,851

(22) Filed: Jul. 20, 1999

(30) Foreign Application Priority Data

Jul. 21, 1998 (JP) .......................................... 10-205187

(51) Int. Cl.[7] ............................ H04N 5/76; H04N 5/781
(52) U.S. Cl. ........................................ 386/111; 386/125
(58) Field of Search ..................... 386/33, 45, 111–112, 386/125–126; 369/60; 375/240.04, 240.05, 240.06, 240.07; 348/423.1; H04N 5/76, 5/781, 5/783, 5/92, 5/93

(56) References Cited

U.S. PATENT DOCUMENTS

| | | | | |
|---|---|---|---|---|
| 4,785,349 A | * | 11/1988 | Keith et al. ................. 358/136 |
| 5,432,769 A | * | 7/1995 | Honjo ......................... 369/60 |
| 5,717,641 A | * | 2/1998 | Ando et al. ................. 365/191 |
| 5,745,445 A | * | 4/1998 | Yasukohchi et al. .......... 369/60 |
| 5,745,639 A | * | 4/1998 | Gensheimer ................. 386/125 |
| 5,802,051 A | * | 9/1998 | Petersen et al. ............. 370/395 |
| 5,854,856 A | * | 12/1998 | Moura et al. ................ 382/232 |
| 5,877,812 A | * | 3/1999 | Krause et al. ............... 348/385 |
| 6,043,897 A | * | 3/2000 | Morikawa et al. .......... 358/1.14 |
| 6,064,795 A | * | 5/2000 | Uchide ........................ 386/111 |
| 6,101,195 A | * | 8/2000 | Lyons et al. ................. 348/512 |
| 6,101,220 A | * | 8/2000 | Ando ........................... 375/240 |
| 6,169,842 B1 | * | 1/2001 | Pijnenburg et al. ......... 386/125 |
| 6,205,156 B1 | * | 3/2001 | Watanabe et al. ........... 370/474 |
| 6,223,261 B1 | * | 4/2001 | Ogawa ......................... 711/150 |
| 6,240,244 B1 | * | 5/2001 | Ikeda .......................... 386/125 |
| 6,295,409 B1 | * | 9/2001 | Ikeda .......................... 386/125 |

FOREIGN PATENT DOCUMENTS

JP            9-46691       *    2/1997

* cited by examiner

*Primary Examiner*—Thai Tran
(74) *Attorney, Agent, or Firm*—McDermott, Will & Emery

(57) ABSTRACT

An apparatus for simultaneously writing a data stream onto a recording medium with a low writing and reading rate such as an optical disk and outputting a data stream stored on the recording medium. In the apparatus, the first buffer retains an inputted data stream. The stream held in the first buffer is written on the recording medium. The stream recorded on the recording medium is read onto the second buffer to output the stream to an external device. The writing and the reading are controlled based on the duration to consume the stream held on the second buffer, so that the writing and reading are real-time.

11 Claims, 14 Drawing Sheets

Fig. 2

(In case a time table is used)

| Time | Data offset |
|---|---|
| 0.00sec | 0 Byte |
| • | • |
| • | • |
| a01 sec | b01 Byte |
| a02 sec | b02 Byte |
| • | • |
| • | • |
| a03 sec | b03 Byte |
| a04 sec | b04 Byte |
| • | • |
| • | • |
| a0n sec | b0n Byte |

Fig. 3(a) (Video-audio data of MPEG formula)
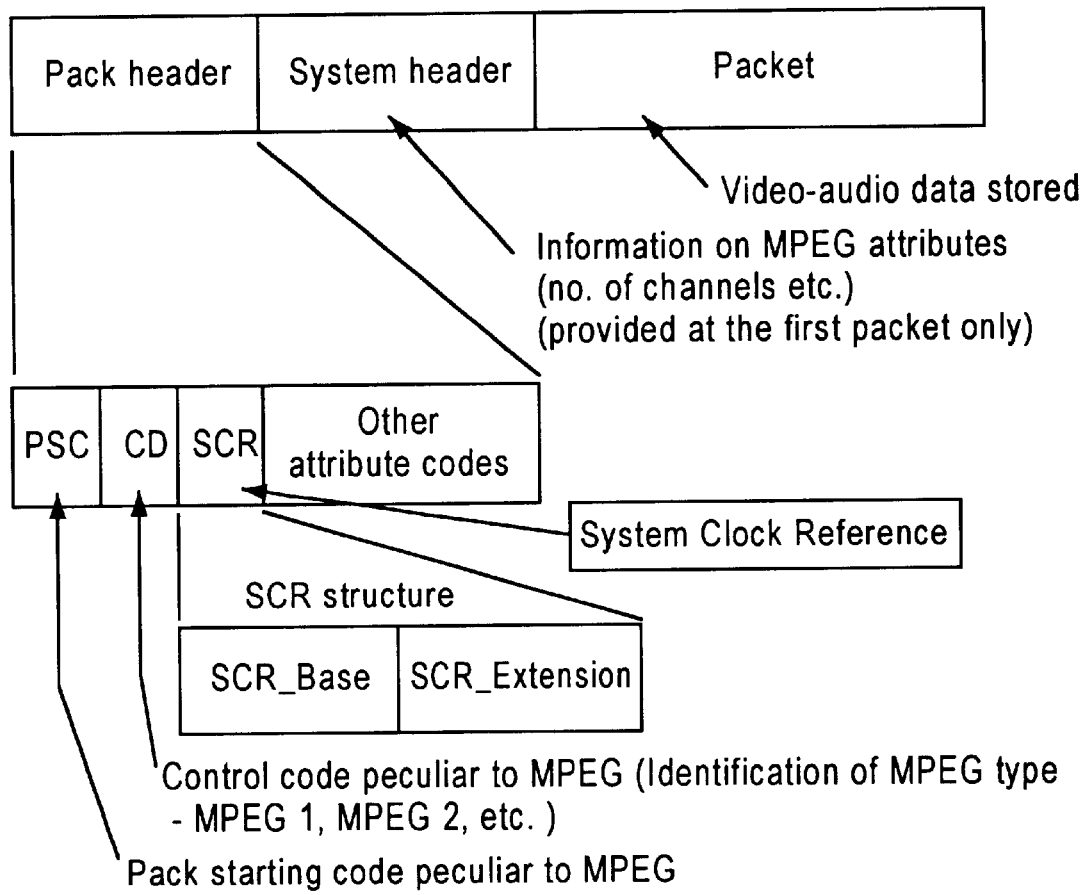
Fig. 3(b) (Prediction from stream data)
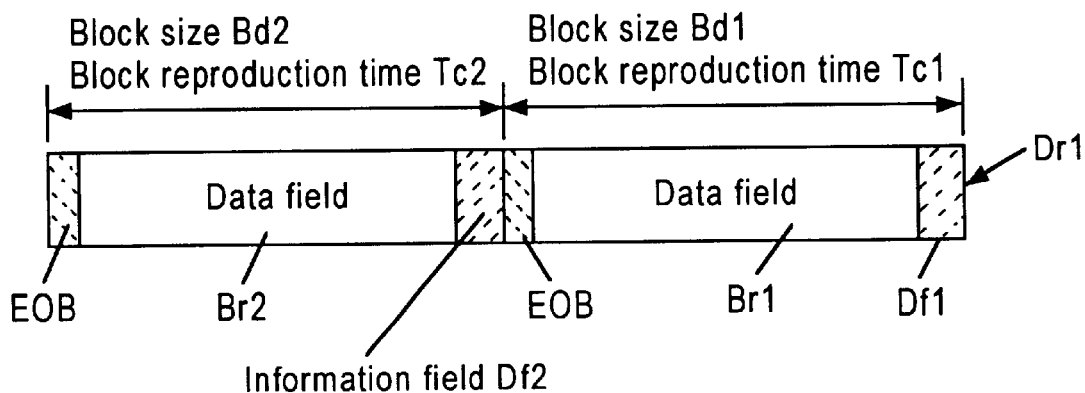

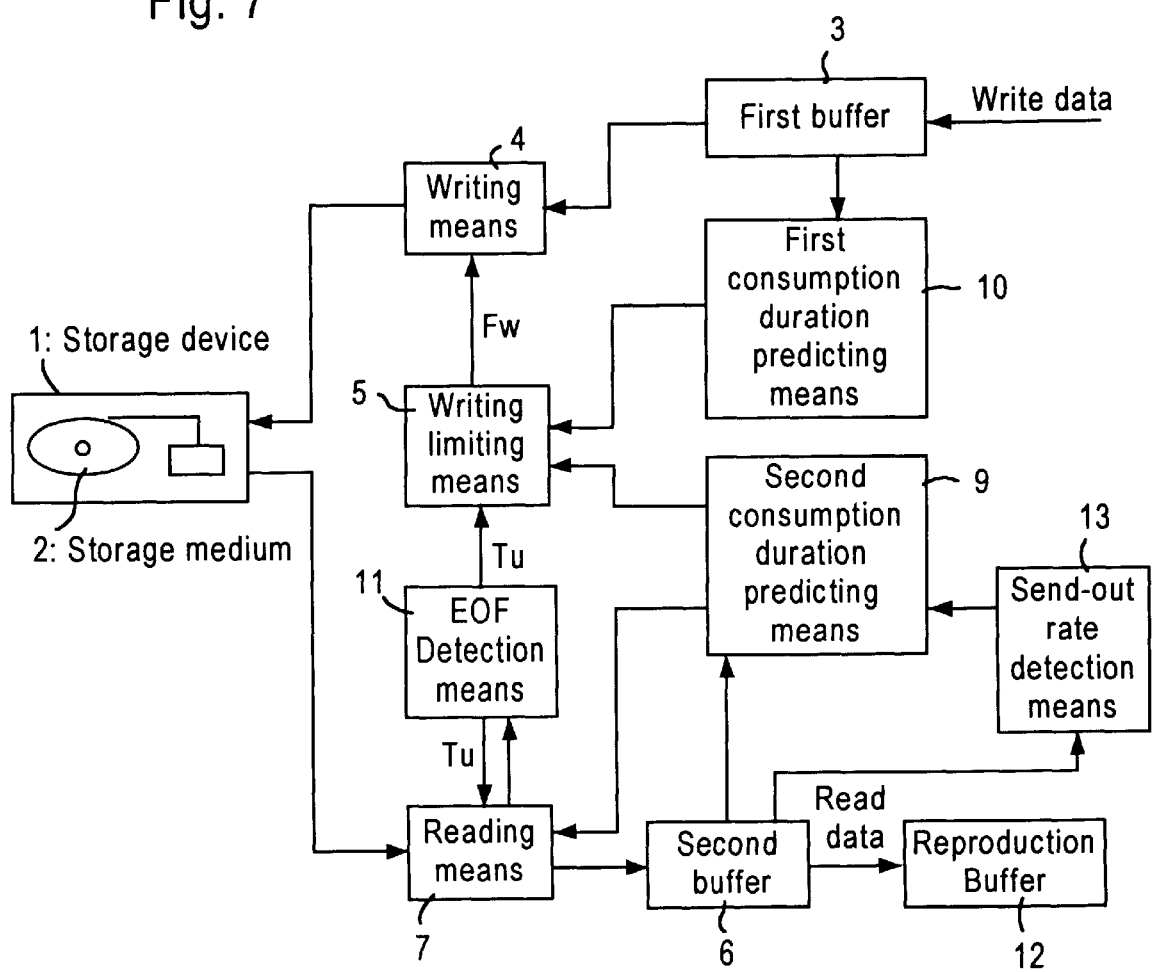

Fig. 8(a)
Correction of data consumption duration:
Second buffer 6
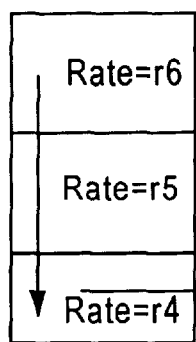
Reproduction buffer 12
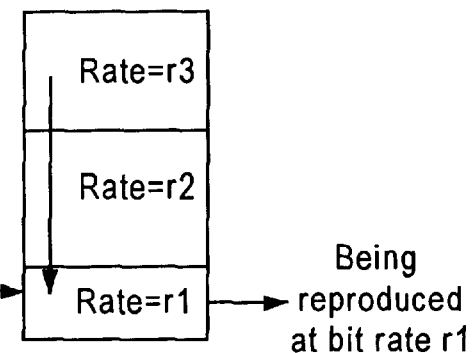
Fig. 8(b)
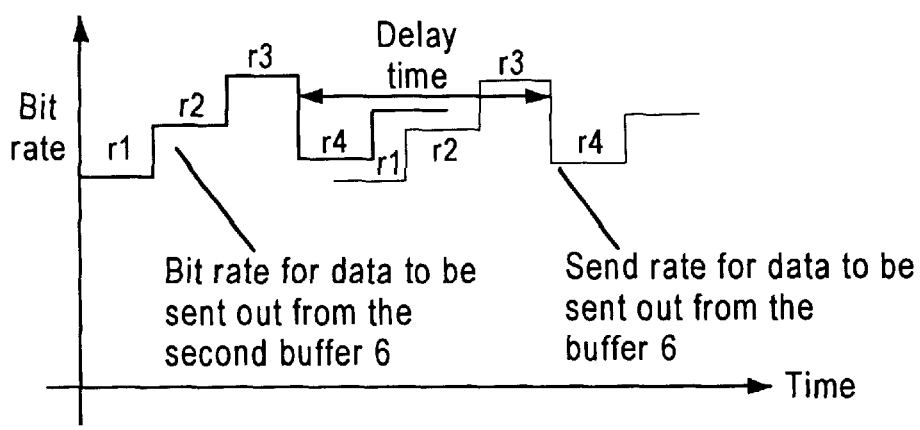

APPARATUS FOR SIMULTANEOUSLY WRITING AND OUTPUTTING DATA STREAM

BACKGROUND OF THE INVENTION

1. Field of the Invention

The present invention relates to a data output apparatus for data writing on, and reading from, storage memories, particularly storage memories using storage media like an optical disk.

2. Description of the Prior Art

Heretofore, when such data as video-audio data was to be written on or read from a storage device, the data as requested was sent to or transferred from the storage memories in small segments of a specific size for transfer, 64 kilobytes, for example—the size specified by OS.

If a writing request for data was made when another data was being read out from the storage device, the reading would change to the writing and the writing to the reading by turns per data size of the data divided into small segments. Therefore, it may causes that the head of the storage device moves to a specific portion—that is called "seek"—whenever the mode changes.

The storage device generally comprises a hard disc drive including a hard disc as a storage media. Even if out and on such storage device moving picture data with high-bit rate such as MPEG2 are read and written simultaneously, the duration required to seek (in case of a low performance disk, not longer than 20 m.s.) is shorter as comparing with the duration required to transfer the specific size of data (for example, to transfer a specific size of 256 kilobytes at not more than 40 m.s.). Furthermore, the transfer capacity of the storage device was large fully enough for the bit rate of data. Accordingly there are no problems with that system, and it was not necessary to take into consideration the duration required to seek.

However, that was not the case with the storage memories using an optical disk like DVD as storage medium. Unlike when a hard disk drive was used, the duration required to seek was very long (at about one second) as comparing with the duration required to transfer data. Furthermore, the capability of the storage device using an optical disk is very low in transfer (for example, at 10.08 Mbps., the duration needed to transfer a specific size of 64 kilobyte is 50 m.s.) Therefore, if a request for writing is made when a high bit rate moving picture data such as MPEG 2 is being read out, the total bit rate of the data to read out and the data to write could go up beyond the transfer capacity of the storage device. And since the storage device has to seek each time of switching to reading out and writing, and even if the total bit rate of the data to read out and the data to write is close to the transfer capacity of the storage device, those data could not be transferred real-time on account of the "seek" duration needed. The result was that a stream of data like video-audio data would be interrupted in writing or reading data.

SUMMARY OF THE INVENTION

The present invention addresses that problem. And it is an object of the present invention to provide a data output apparatus that guarantees real-time in writing and reading of data stream.

To achieve the aforesaid object, the present invention is built on a data output apparatus in which a data stream to input is first written on a recording medium (in FIG. 1, a storage media 2 loaded on a storage device 1) and the data stream recorded on the recording medium is read out and outputted to external device.

The data stream contains video information compressed at a variable bit rate. The data output apparatus is provided with a first buffer 3 that retains the inputted data stream, writing means 4 for writing on the aforesaid recording medium the data stream held in the first buffer 3, second buffer 6 for holding the data stream to output to external device, reading means 7 for reading on to the second buffer 6 the data stream recorded on the recording medium, predicting means 20 (second duration predicting means 9) for predicting the consumption duration W to consume the data stream held on the second buffer 6 on the basis of the duration needed for presentation of video information contained in the data stream held on the second buffer 6—second predicted consumption duration W—, and writing limiting means 5 or/and reading limiting means 14 for controlling the writing means 4 and reading means 7 as control means 21.

The writing means 4 writes and reading means 7 reads the data stream exclusively on the recording medium. The control means 21 so controls the writing means 4 and reading means 7 on the basis of the second predicted consumption duration W that the second buffer will not underflow.

Furthermore, the control means 21 so controls the writing means 4 and reading means 7 as to keep down the number of switchings between writing and reading the data stream on the recording medium.

Also, the control means 21 controls the writing means 4 and reading means 7 in such a way that in case the second predicted consumption duration W predicted by the predicting means 20 is not lower than a second threshold value T2, a permit will be given for writing of the data stream from the first buffer on the recording medium. The second threshold value T2 is a value defined this way. With the maximum duration needed for writing a specific size of segment of data stream on the recording medium as the first maximum duration Tw and the maximum duration needed for reading a specific size of segment of data stream on to the second buffer as the second maximum duration Tr, a value larger than the second maximum duration Tr shall be called first threshold value T1, and the value obtained by putting the first maximum duration Tw and the second maximum duration Tr together shall be given as second threshold value T2.

In addition, the control means 21 so controls the writing means 4 and reading means 7 that in case second predicted consumption duration W predicted by the predicting means 20 is less than the second threshold value T2, the control means 21 prohibits writing the data stream on the recording medium from the first buffer and permits writing the data stream on the second buffer from the recording medium.

There is also provided a memory retaining a time table on which the offset values $b01, b02, \ldots, b0n$ of the data stream are linked or related to the times $a01, a01, \ldots, a0n$ required for the offset values $b01, b02, \ldots, b0n$ of the data stream to be reproduced. And the predicting means 20 measures the amount of data sent out from the second buffer and the amount of data inputted into the second buffer. On the basis of the amount of data sent out and the amount of data inputted, a calculation is made to find the initial offset value $b0i$ and the last offset value $b0j$ of the data stream retained in the second buffer. Then, reference is made to the time table to acquire the time $a0i$ for the offset value $b0i$ and the time $a0j$ for the offset value $b0j$. And the second predicted consumption duration, that is, $a0j$-$a0i$ is worked out.

It is also possible to work out the second predicted consumption duration $a1j$-$a1i$ under the following arrangement provided with a memory having a time table on which the durations "a11-0," "a12-a11," "a13-a12," ... "a1n-a1(n–1)" are linked to the bit rates $r11, r12, r13 \ldots, r1n$ of the data stream at the respective durations. Under that arrangement, the predicting means 20 measures the amount of data sent out from the second buffer and the amount of data inputted to the second buffer. On the basis of the amount of data sent out and the amount of data inputted, a calculation is made to find the initial offset value $a1i$ and the last offset value $a1j$ of the data stream held in the second buffer. Thus, the second predicted consumption duration $a1j$-$a1i$ is worked out.

Furthermore, in case the data stream is a data stream of the MPEG formula, the predicting means 20 acquires the time code to be used for reproduction that is included in the data stream of the MPEG formula held on the second buffer. On the basis of the time code, the second predicted consumption duration can be found.

The time code may be the system clock reference in the pack header provided at the head of each of the packs that form program stream of the MPEG formula or the program clock reference in the adaptation field of each of the transport packets forming the transport stream of the MPEG formula.

Further, in case the data stream is a data stream in which bit rate information of data stream block at the time of reproduction is recorded at the information field provided at the head of the respective blocks of data stream, the predicting means 20 acquires bit rate information at the time of reproduction in the respective blocks of the data stream held on the second buffer and the respective block size. And on the basis of the bit rate information and the block size, predicting means 20 works out the second predicted consumption duration.

The foregoing examples work under the condition that the send rate of the second buffer 6 is identical with the bit rate of the data stream. In case the data output unit is connected to a unit for reproduction of data to be outputted from the data output unit and to a reproduction buffer 12 that temporarily holds data sent out to the aforesaid reproduction unit, the send rate of the second buffer 6 is no longer the same as the bit rate of the data stream. With consideration given to such a case, the following arrangement is also possible for prediction of the second predicted consumption duration. That is, send rate detection means 13 detects the amount of data sent out per unit period from the second buffer. And the predicting means 20 works out the second predicted consumption duration on the basis of the history of the amount of data sent out per unit period from the second buffer and the history of the time required for presentation of video information contained in the data stream held in the second buffer.

BRIEF DESCRIPTION OF THE DRAWINGS

FIG. 2 is a conceptual diagram illustrating the second predicted consumption duration of the present invention.

FIG. 3 is another conceptual diagram illustrating the second predicted consumption duration of the present invention.

FIG. 7 is a block diagram showing still another embodiment of the present invention.

FIG. 8 is a conceptual diagram illustrating the correction of the second predicted consumption duration of the present invention.

DESCRIPTION OF THE PREFERRED EMBODIMENTS

Embodiment 1

Figure 1:
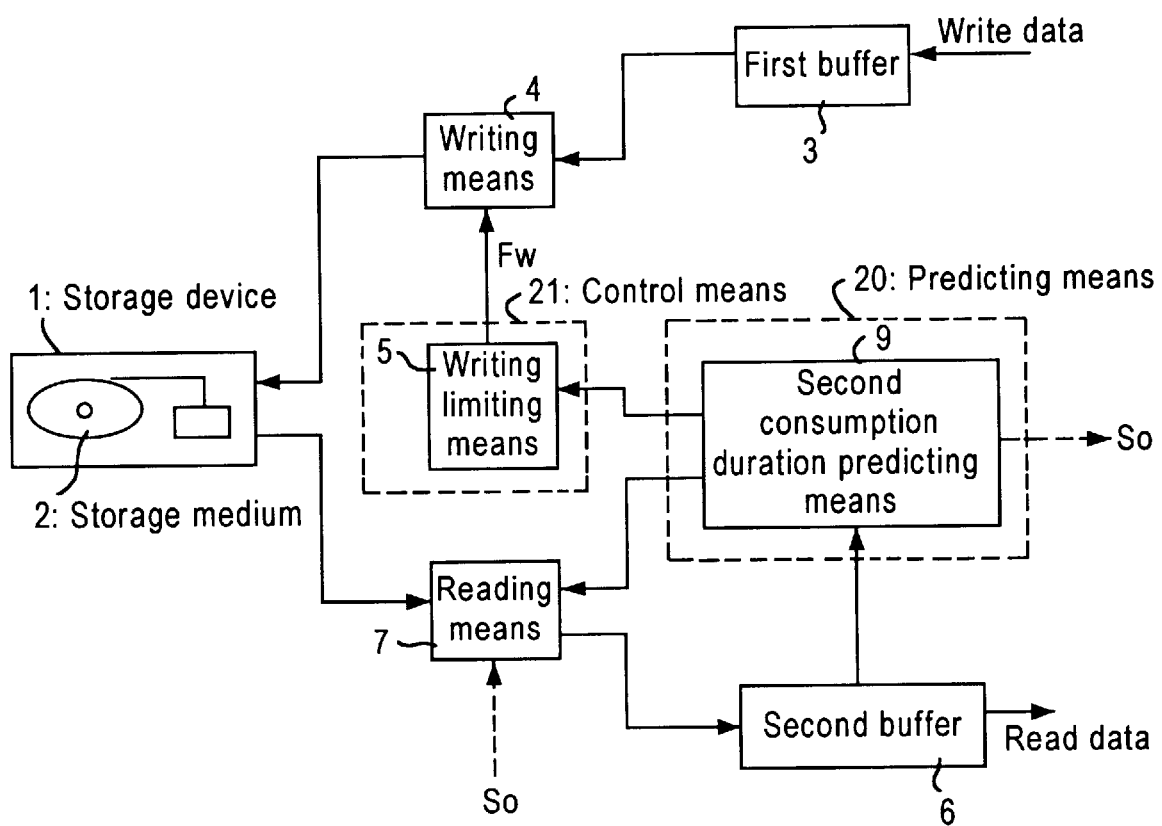
FIG. 1 is a block diagram showing the configuration of an embodiment of the present invention.
Figure 5:
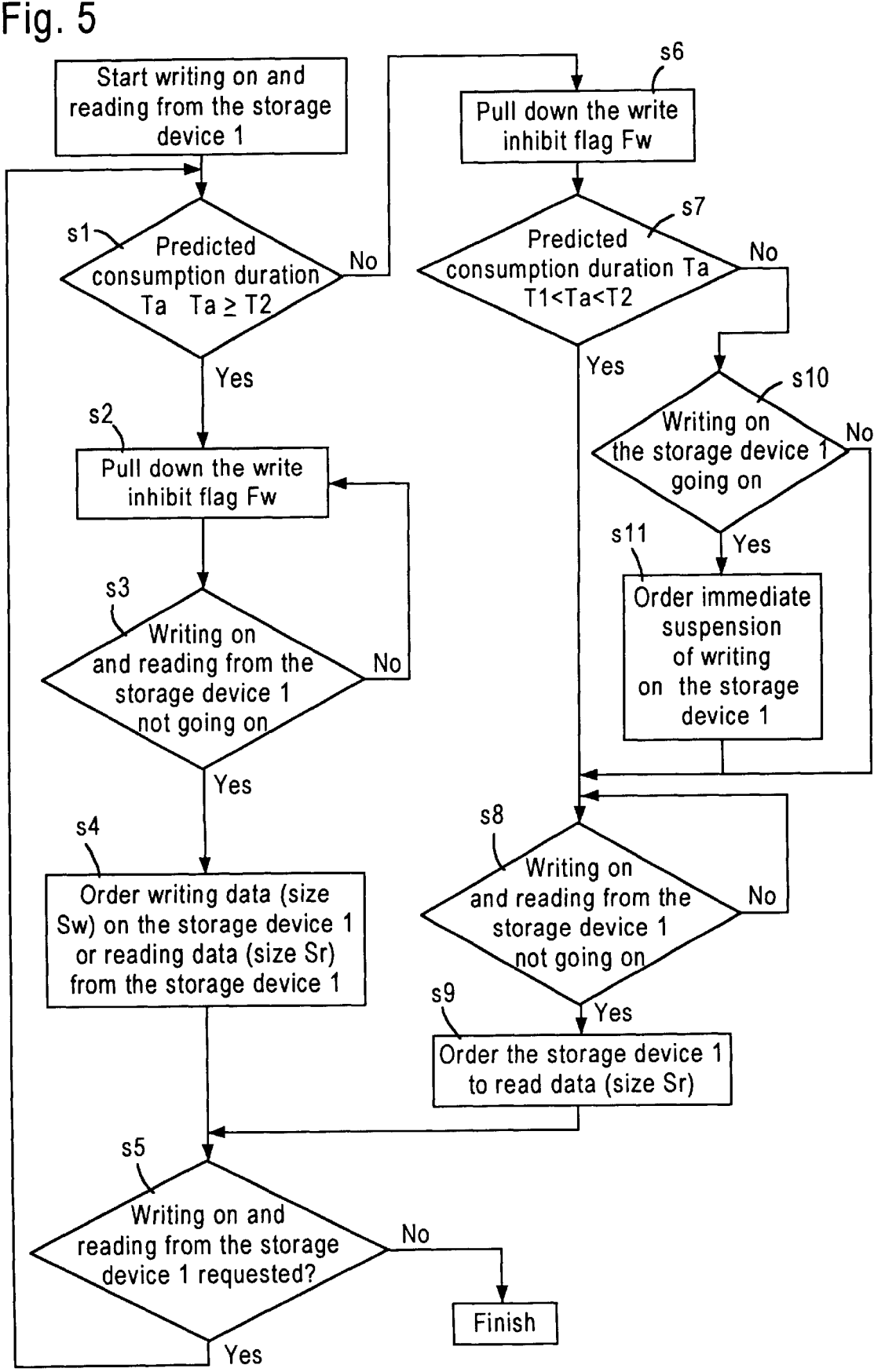
FIG. 5 is a flow chart of an embodiment of the present invention.

FIG. 1 is of a block diagram outlining the whole system of a first embodiment of the present invention. FIG. 5 is a flow diagram showing the operating process in the present embodiment. This embodiment will now be described with reference to the drawings.

The data output apparatus of the present invention has a storage device 1 mounted with a storage media 2 such as DVD. It is so arranged that a specific size of data stream can be written on the storage media 2 from a first buffer 3 through writing means 4.

Meanwhile, a specific size of data stream is read by reading means 7 from the storage media 2 mounted in the storage device 1 and then stored temporarily in a second buffer 6 before being outputted to external device such as a reproducing terminal.

Second consumption duration predicting means 9 predicts the consumption duration to consume the data stream held in the storage media 2—second predicted consumption duration—by one of the following methods. The following description is for cases where the data stream is a video-audio data.

(1) Method based on a time table

The second consumption duration predicting means 9 constantly monitors the amount of data stored in the second buffer 6 from the storage device 1 and the amount of data sent out from the second buffer 6, both up to the present.

A time table Mt as shown in FIG. 2 is stored in second consumption duration predicting means 9, for example. On the table Mt, the offset values $b01, b01, \ldots, b0n$ from the top of video-audio data Dr1 to be read are registered linked to the times $a01, a01, \ldots, a0n$ for the video-audio data Dr1 of the offset values $b01, b01, \ldots, b0n$ to be reproduced.

In that state, second consumption duration predicting means 9 takes the amount of data stored in the second buffer 6 and measured up to the present as the second offset value b0$j$ of the video-audio data Dr1 and the amount of data sent out from the second buffer 6 as the first offset value b0$i$ of the video-audio data Dr1. Then, the first offset value b0$i$ and the second offset value b0$j$ are checked against the time table to work out the second predicted consumption duration (a0$j$-a0$i$) from the times a0$i$ and a0$j$ corresponding to the respective offset values. It can happen that the time table has no corresponding figures corresponding to the first offset value b0$i$ and the second offset value b0$j$. For example, the first offset value b0$i$ is between the offset value b01 and the offset value b02 and the second offset value b0$j$ is between the offset value b03 and the offset value b04. In such a case, the second predicted consumption duration is worked out from the offset value nearest to and larger than the first offset value b0$i$, that is, the offset value b02 and the value nearest to and less than the second offset value b0$j$, that is, the offset value b03. In other words, the second predicted consumption duration (a03-a02) is calculated.

The time table Mt may use information on bit rates (r11-r1$n$) at the time of reproduction that are set for the respective reproduction times of video-audio data Dr1 instead of the relation between the offset values and the times. In that case, too, second consumption duration predicting means 9 first finds the measured amount of data sent out from the second buffer and the amount of data stored in the second buffer 6 up to the present and then works out the second predicted consumption duration from the time table Mt. The time table Mt is stored in the storage media 2 along with the video-audio data Dr1 and read onto second consumption duration predicting means 9 when the file is opened.

(2) Method for the video-audio data of the MPEG formula and the like

The video-audio data of a program stream of the MPEG formula, for example, is provided with a segment for recording the system clock reference (SCR)—the time when the MPEG decoder requires a pack of data—in the pack header at the top of the pack forming video-audio data as shown in FIG. 3($a$).

The video-audio data of the MPEG formula has each frame, or unit of image, divided into packs of a specific size. Data is encoded with the offset time—the time when the decoder requires the pack—being recorded on the SCR segment of each pack.

The second predicted consumption duration is calculated as difference between the value SCR 1 of SCR of the pack to be sent out from the second buffer out of the data yet to be sent which is held in the second buffer and the value SCR 2 of SCR of last pack stored in the second buffer from the storage device.

It is noted that when MPEG data are prepared at a variable rate, the preparation of next data is held back until the starting time of next frame. The difference in SCR between the packs just before and after the gap between the frames is larger than the SCR difference between the consecutive packs in one frame, which is equal to about the time for a pack of data size about at the time of the highest bit rate.

By the way, the decoder does decoding frame by frame. If data in the second buffer is cut halfway in a frame, second predicted consumption duration worked out as shown above will not be accurate. From the aforesaid SCR difference between packs, therefore, the gap between frames is found out, and the SCR value of the SCR 3 of the pack immediately following the frame gap is worked out. The, the value SCR1 of the aforesaid SCR is subtracted from the value SCR 3 of the SCR. The value thus obtained will be the second predicted consumption duration.

In case of a transport stream of the MPEG formula, the program clock reference in the adaptation field of the transport packet can be used in place of the aforesaid SCR.

(3) Method used in case information on bit rate at the time of reproduction is recorded inside the data:

There will be explained an example where video-audio data Dr1 to be read out as shown in FIG. 3($b$) is split into a plurality (n pieces) of blocks of a specific size. The aforesaid respective blocks, Br1, Br2 . . . are provided with information fields Df1, Df2 . . . in which the bit rates and sizes of blocks are recorded and EOB's (end of blocks) that indicate the end of the block. It is noted that the last EOB which has to indicate the end of file is also an EOF (end of file) indicator.

In this example, second consumption duration predicting means 9 picks out the block bit rates and sizes from information field Df1, Df2 . . . of the video-audio data Dr1 stored in the second buffer 6. On the basis of those block bit rates and sizes is worked out second predicted consumption duration. In case bit rates alone are recorded in information field Df1, Df2 . . . , second consumption duration predicting means 9 extracts the size between the EOB's in addition to the bit rate and thus the second predicted consumption duration is worked out.

Next there will be explained, with reference to FIG. 4, an example of controlling the data stream where the reading and writing of video-audio data are effected simultaneously.

Let it be presumed that video-audio data Dr1 is read through reading means 7 from the storage media 2 mounted in the storage device 1 while video-audio data Dw2 is written through writing means 4. The duration required for reading of a unit size Sr for one reading from the storage device 1 is different from reading and reading, because the seek duration of the aforesaid head is different according to conditions such as the position of the reading head and the position on the storage media 2 of the stored video-audio data to be read. For the same reason, the duration needed for one writing (writing of the unit size Sw) is different from writing to writing.

Figure 4:
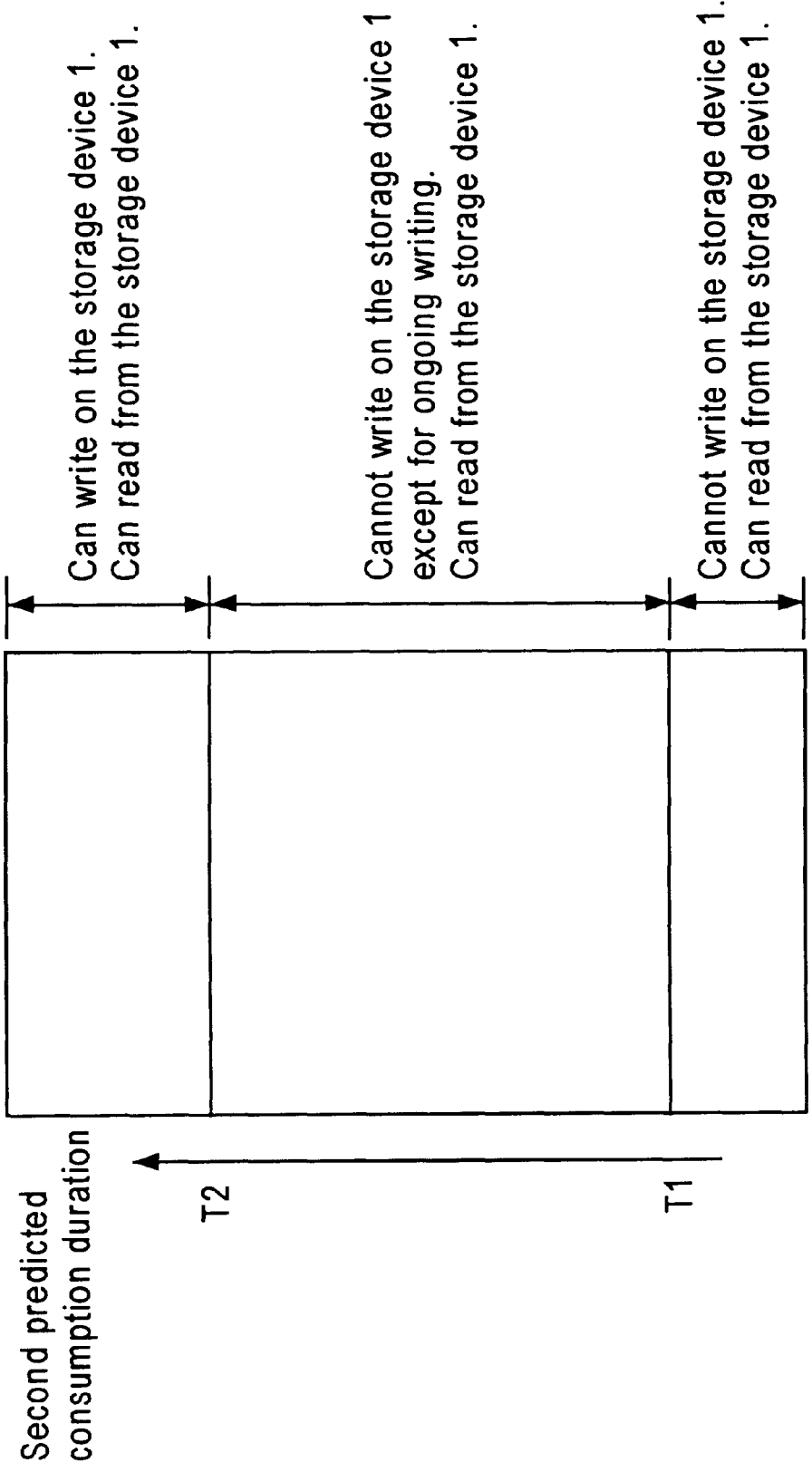
FIG. 4 is a conceptual diagram illustrating the operation of control means of the present invention.

Here, when a unit size Sr for one reading is read out, a value larger than the maximum (longest) duration required for one reading—the second maximum duration Tr—is preset as first threshold value T1 as shown in FIG. 4. This is done in consideration of the maximum waiting duration—the first waiting duration—from immediately after the end of one reading or writing to the point when the next request for reading or writing can be made. Also, the second threshold value T2 is so set that (T2−T1) is larger than the maximum (longest) duration Tw—the first maximum duration—required for writing a unit size Sw for one writing in the storage device 1.

Now, there will be explained an example where:

the amount of data the storage device 1 can read out per unit period: Cr the amount of data the storage device 1 can write per unit period: Cw the amount of data that can be transferred from the storage device 1 per unit period: Sr the amount of data that can be transferred to the storage device 1 per unit period: Sw first waiting duration in the storage device 1: TDS The first threshold value T1 is set to a value larger than the second maximum duration Tr to prevent the second buffer 6 from underflow while the reading of next data is requested by reading means 7 and the data may be stored in the second buffer 6, that is, the following conditions may be met.

$$T1 > TDS + Sr/Cr \quad (1)$$

Then, the second threshold value T2 is so set that (T2−T1) is larger than the first maximum duration Tw, that is, the following may be met:

$$T2 - T1 > TDS + Sw/Cw \quad (2)$$

If writing is not done under the aforesaid conditions that the second predicted consumption duration is less than the second threshold value T2, then reading means 7 reads data onto the second buffer 6 from the storage device 1. Then, the reading of data is continued until the second predicted consumption duration is not less than the second threshold value T2. In case the second predicted consumption duration is not less than the second threshold value T2, no writing in the storage device 1 is requested. And if the second buffer 6 is not full, data will be read from the storage device 1 on to the second buffer 6. If the second buffer 6 is full, then there will be no data reading.

It is noted that in case the end of data reading is detected, no data reading will take place even if the second predicted consumption duration is less than the second threshold value T2. The end of data reading is detected this way. EOF detection means 11 detects EOF (end of file) of video-audio data Dr1 (see signal r0 in FIG. 6). Or second consumption duration predicting means 9 detects the data consumption to be 0 (see signal S0 in FIG. 1).

Now there will be described the control of writing video-audio data Dw2, an object for writing. Writing limiting means 5 constantly monitors the second predicted consumption duration worked out by second consumption duration predicting means 9. When the second predicted consumption duration is less than the second threshold value T2, a write inhibit flag Fw is erected to bar writing means 4 from writing (FIG. 5, Steps S1–S6). Then if the second predicted consumption duration is not less than the first threshold value T1 and less than the second threshold value T2, the ongoing writing in the storage device 1 will be carried out while new writing will be prohibited (Steps S7–S8–S9).

Furthermore, in case the second predicted consumption duration is less than the first threshold value T1, then writing limiting means 5 directs writing means 4 to temporarily stop the ongoing writing in the storage device 1, too (Steps S7–S10–S11).

In case the second predicted consumption duration is larger than the second threshold value T2, then the write inhibit flag Fw is pulled down (Steps S1–S2) to lift the ban on the writing by writing means 4. When the end of data writing is detected by EOF detection means 11 of EOF, the write inhibit flag Fw will be pulled down even if the second predicted consumption duration is less than the second threshold value T2.

As the writing of video-audio data Dw2, the object for writing, is started under that setup, the data will first be stored in the first buffer 3. Before starting to write a specific size of data to be written, writing means 4 checks each duration whether the write inhibit flag Fw is up. If the write inhibit flag Fw is not up, the data first stored in the first buffer 3 will be written in the storage media 2 mounted in the storage device 1. If, on the other hand, the write inhibit flag Fw is up, writing means 4 will not do writing.

The process is repeated to write in the storage device 1 until the data stored in the first buffer 3 is exhausted.

As set forth above, video-audio data Dr1 being read is kept real-time by temporarily restricting the writing of video-audio data Dw2 in the storage device 1 on the basis of the second predicted consumption duration while video-audio data Dr1 is being read.

Embodiment 2

In the embodiment 1, whether writing is banned or not is decided on unilaterally according to the state on the reading side. There are cases where it is not always necessary to bar writing totally as will be described in the following, however.

Figure 6:
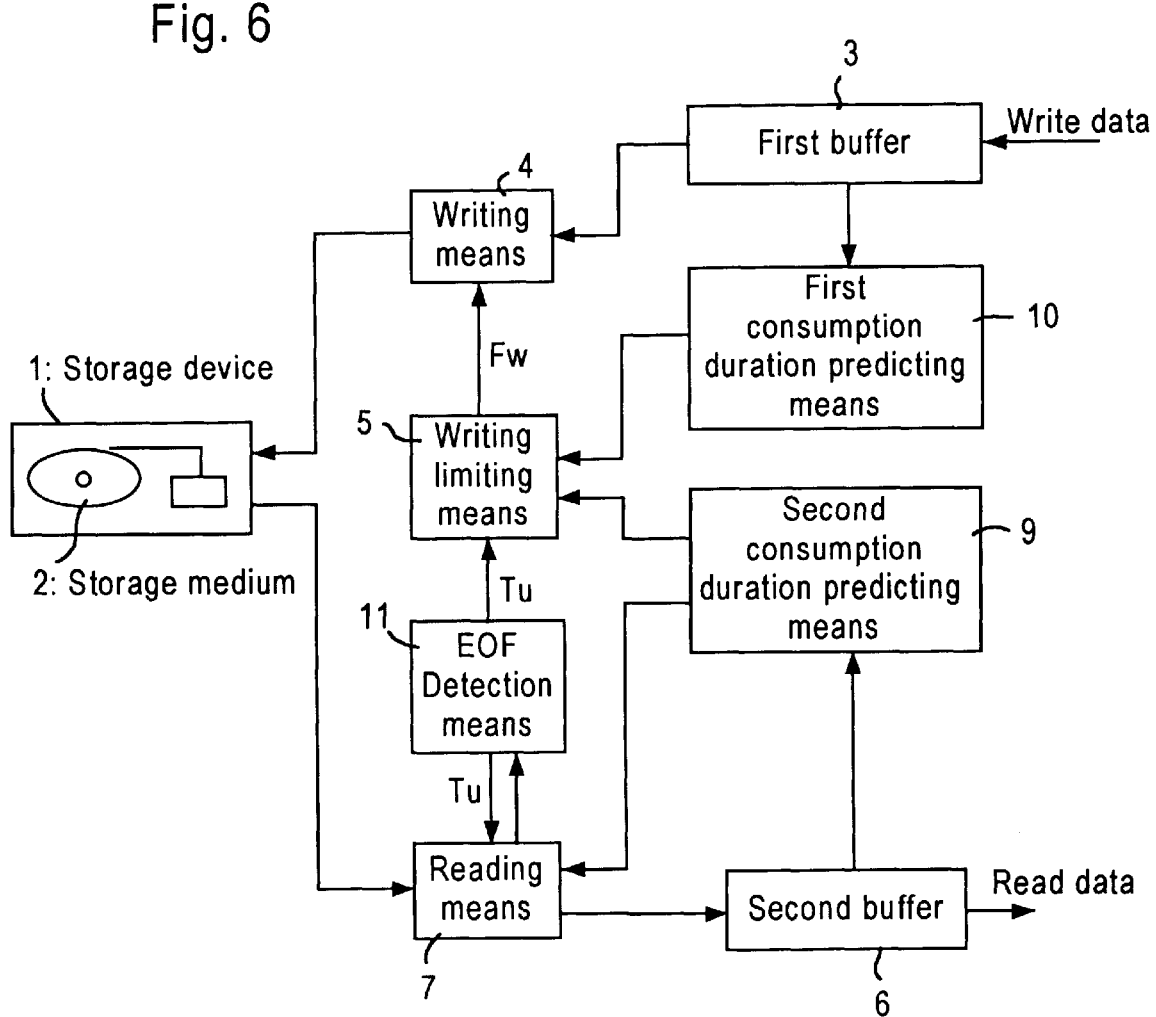
FIG. 6 is a block diagram showing the configuration of another embodiment of the present invention.

The present embodiment is, as shown in FIG. 6, configured as in Embodiment 1 and additionally provided with first duration predicting means 10 where the first waiting time TDS and the amount of data that can be written per unit period are registered in advance.

First duration predicting means 10 works out the duration required for writing data in the storage device 1 from the first buffer 3—the first predicted consumption duration—on the basis of the above registered information and the amount of data Sw2 held temporarily in the first buffer 3. The first predicted consumption duration can be worked as follows:

$$TDS + Sw2/Cw$$

The current value Ta of the second predicted consumption duration by second consumption duration predicting means 9 is also given to writing limiting means 5. And as in Embodiment 1, in case the current value Ta is less than the second threshold value T2, writing limiting means 5 pulls up the write inhibit flag Fw to bar writing means 4 from writing. Also, when the current value Ta is not lower than the second threshold value T2, the procedure is taken as in Embodiment 1.

Now, there will be described an example of writing control where the reading and writing of video-audio data are effected simultaneously.

In case the first predicted consumption duration is less than (Ta−T1) in a state under which the writing prohibition is lifted with the current value Ta of the second predicted consumption duration not lower than the second threshold value T2, writing limiting means 5 so controls writing means 4 that all the data already written in the first buffer 3 is continuously written in the storage device 1.

On the other hand, in case the first predicted consumption duration is not lower than (Ta−T1), writing limiting means 5 so controls writing means 4 that the amount of data that can be written in a duration of (Ta−T1), that is, data in a size not larger than (Ta−T1−TDS)×Cw is continuously written in the storage device 1

In case writing is done continuously, the duration required for writing in the storage device 1 data in a unit size Sw N durations is less than N×Tw (Tw: duration required for writing the unit size Sw, that is, TSD+Sw/Cw as give in Expression (2)), because the first waiting duration is needed for the first unit size Sw only and not for the subsequent writings.

As set forth above, in case the first predicted consumption duration and the second predicted consumption duration are worked out and it is interpreted that the duration required for continuous writing can be secured, data will be written in the storage device 1 continuously. Thus, the efficiency of writing data can be increased.

Embodiment 3

In the foregoing embodiments described, no consideration is given to the processing state in equipment after or on the downstream side of the second buffer. But in case the second buffer 6 is connected with the buffer in a reproduction unit directly or via network, it is necessary to take the condition in the buffer into account.

FIG. 7 is a block diagram outlining the whole system of a third embodiment of the present invention.

The present embodiment is set up by providing a reproduction buffer 12 on the reproduction side in the configuration of Embodiments 1 and 2 combined.

In the present embodiment, let it be supposed that the reproduction buffer 12 retains data of which the amount to be used for reproduction per unit period—bit rate—is variable as shown in FIG. 8(a). There are pieces of data coming up continuously with bit rates r1, r2, r3 in that order. And the piece of data with the bit rate r1 is being reproduced. In the second buffer 6, meanwhile, successive pieces of data with bit rates of r4, r5, r6 are held. And following the piece of data with the bit rate of r3 held on the reproduction buffer 12, the piece of data with the bit rate of r4 is sent out to the reproduction buffer 12 from the second buffer 6.

In that state, the amount of data sent out from the second buffer 6 per unit period—the send rate—is not the bit rate r4 of the piece of data being sent out at the moment but is equal to the bit rate r1 of the piece of data now being reproduced as shown in FIG. 8(b). Furthermore, when the piece of data with the bit rate r2 begins to be reproduced after the reproduction of the data with the bit rate r1 is over, the send rate of the data to be sent out from the second buffer is r2. The send rate will be r3 when the reproduction of the data with the bit rate of r2 is over and the send rate will be r4 when the reproduction of the data with the bit rate of r3 is over. That is, the send rate of data to be sent out from the second buffer 6 will be equivalent to the bit rate of the data now being reproduced. Therefore, the send rate of the data to be sent out from the second buffer 6 after a certain delay time should be the same as the bit rate of the data sent after that delay time in the past.

It is so arranged, therefore, the bit rate value recorded in video data in advance is picked out by send-out rate detection means 13 from the data held in the second buffer 8, and its history is memorized. On the other hand, second consumption duration predicting means 9 works out the send rate of the data now being sent out on the basis of the amount of data sent out from the second buffer 6 per unit period. From the timing difference that causes changes in the history and the send out rate, second consumption duration predicting means 9 can predict the duration until the data sent out from the second buffer 6 is actually reproduced—the delay time. Then, second consumption duration predicting means 9 will work out the second predicted consumption duration from the delay time, the history and the amount of data held in the second buffer 6.

An example where the bit rate is written in data has just been described. In other cases, the history of bit rates is recorded the following way.

The bit rate of part of the data on the second buffer 6—segment bit rate—can be worked out from the amount of data to be calculated on the second buffer 6—segment accumulated amount—and the second predicted consumption duration corresponding to the amount of data obtained in the same way as in the foregoing embodiments—segment data consumption predicted duration. That is, segment bit rate=segment accumulated amount/segment data consumption predicted duration. Send-out rate detection means 13 works out the segment bit rate and memorizes the history. The subsequent steps are exactly the same as described above.

Thus, it is possible to make a predication of consumption in the second buffer 6 even if the second buffer 6 is connected with another reproduction buffer 12 thereafter or on the downstream side thereof.

Embodiment 4

There have been described examples where one video-audio data is an object to be read. The same approach is applicable to examples where to be read are a plurality of video-audio data.

In such a case, too, the second threshold value T2 is so set that (T2−T1) is larger than the maximum (longest) duration Tw required for writing in the storage device 1 a unit size Sw of data for one writing as in Embodiment 1. Herein T1 is the first threshold value larger than the maximum (longest) duration Tr required for reading from the storage device 1 a unit size Sr of data for one reading.

Figure 10:
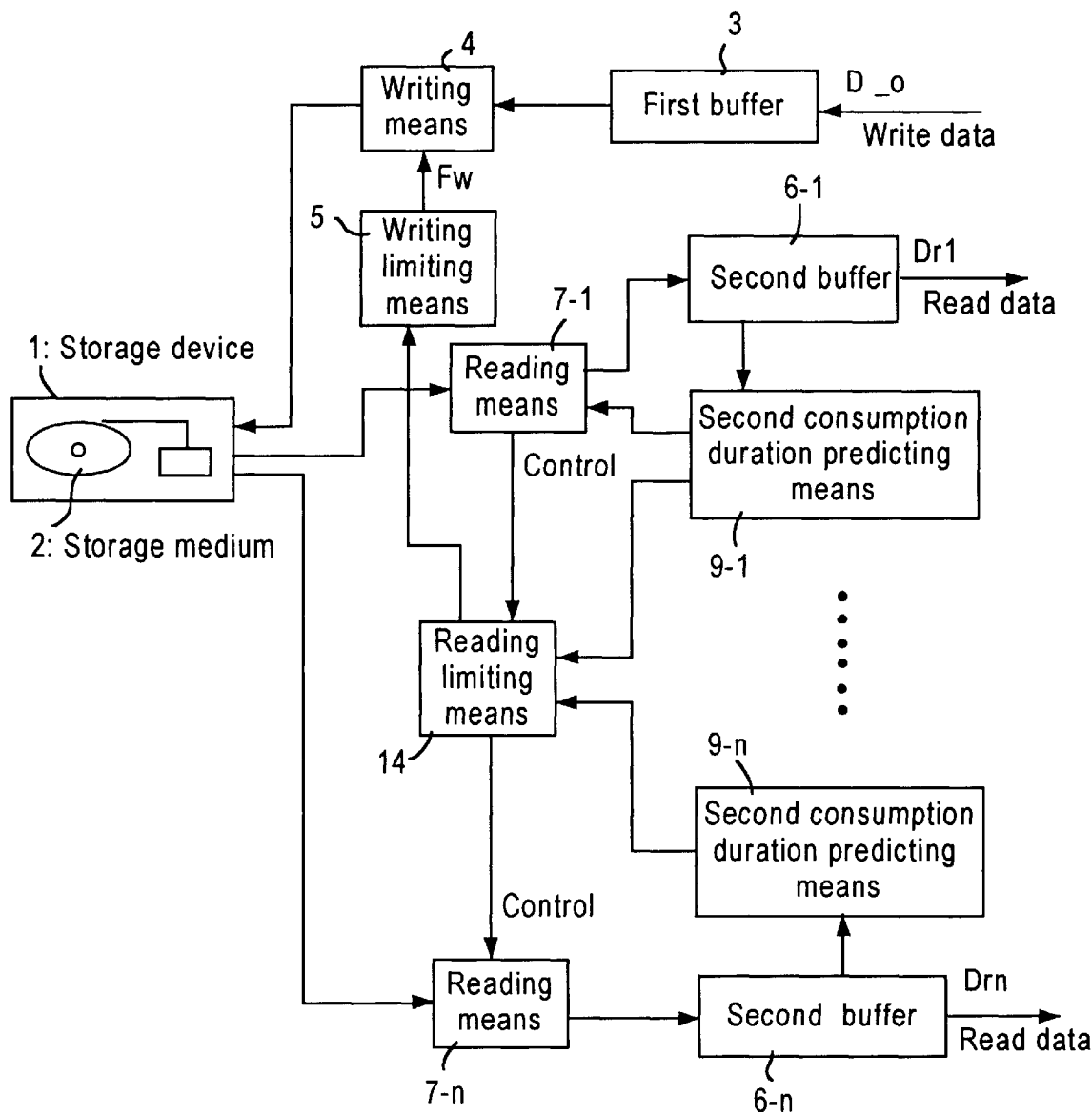
FIG. 10 is a block diagram showing an embodiment of the present invention in case there are a plurality of video-audio data to be read.

There will now be explained an example where one piece of video-audio data Dw0 is to be written and n pieces of video-audio data Dr1–Drn are to be read. As shown in FIG. 10, the video-audio data Dw0 to be written is first held in the first buffer 3 and then recorded on the storage media 2 through writing means 4. And writing means 4 is controlled by writing limiting means 5 as to whether to write data or not as described in the following.

Meanwhile, the video-audio data Dr1 to Drn, the objects to be read, are each held temporarily in the second buffers 6-1 to 6-n through reading means 7-1 to 7-n before being sent out. For the second buffers 6-1 to 6-n, furthermore, there are provided second consumption duration predicting means 9-1 to 9-n so that the second predicted consumption durations of the second buffer 6-1 to 6-2 may be worked out. In addition, the outputs of second consumption duration predicting means 9-1 to 9-n are inputted in reading limiting means 14. And reading limiting means 14 controls the respective reading means 7-1 to 7-n.

Figure 9:
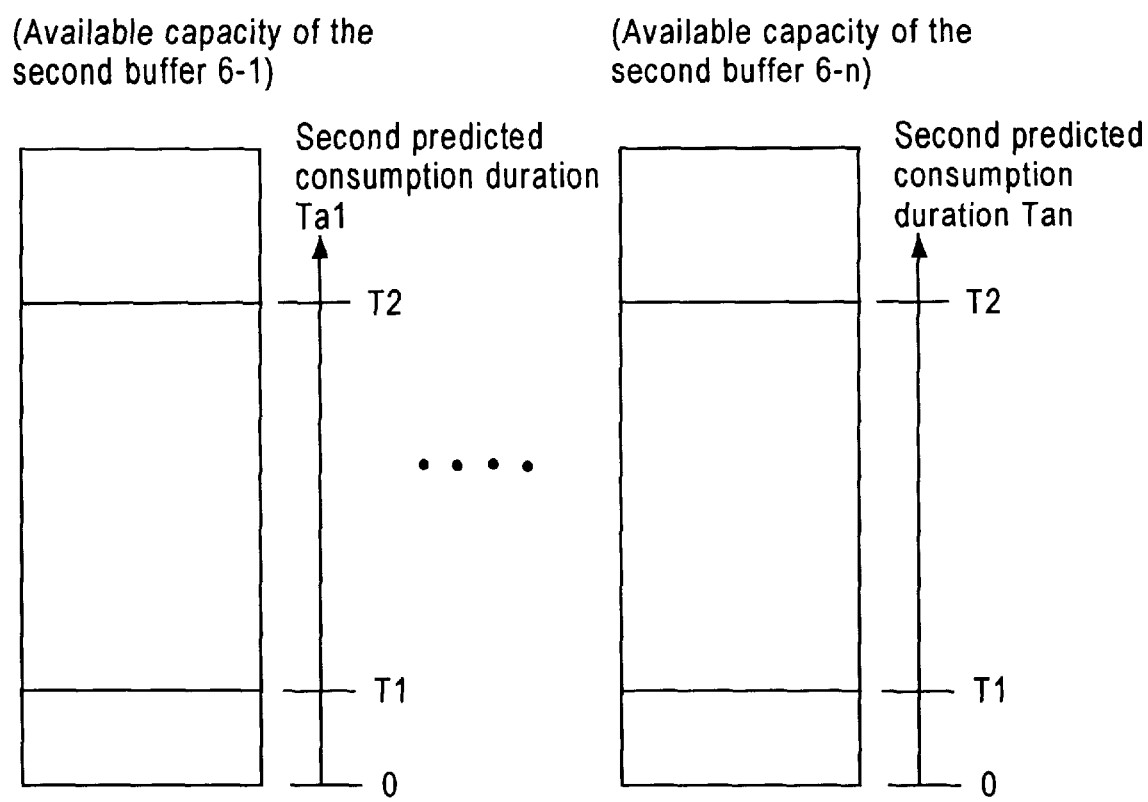
FIG. 9 is a conceptual diagram illustrating the relationship between a plurality of second predicted consumption durations and writing prohibitions according to the present invention.

As shown in FIG. 9, if at least one of the second predicted consumption durations Ta1 to Tan of second consumption duration predicting means 9-1 to 9-n is below the second threshold value T2, reading limiting means 14 pulls up the write inhibit flag Fw so that writing limiting means 5 bars writing means 4 from writing.

That way, writing can be so controlled that continuous reading may be guaranteed, even if the objects to be read are a plurality of video-audio data Dr1 to Drn.

Embodiment 5

In Embodiment 4, the way of limiting writing is described. In the arrangement as shown in FIG. 10, it is possible to restrict the reading on the basis of the mutual relation of a plurality of video-audio data to be read.

First, as in the foregoing respective embodiments, with a value larger than the maximum (longest) duration Tr required for reading from the storage device 1 the unit size Sr of data for one reading as the first threshold value T1, the second threshold value T2 is so preset that (T2−T1) is larger than the first maximum duration Tw required for writing in the storage device 1 the unit size Sw of data for one writing. In addition, it is so arranged in advance that priority numbers are assigned to video-audio data Dr1–Drn to be read.

The second predicted consumption durations obtained from second consumption duration predicting means 9-1 to 9-n described in Embodiment 4 are inputted in reading limiting means 14. If one of the second predicted consumption durations Ta1 to Tan is below the second threshold value T2, that is, there is one video-audio data Drk with that second predicted consumption duration, then reading limiting means 14 bars the reading of video-audio data—of which the second predicted consumption duration is not below the second threshold value T2—from the storage device 1 to the second buffer 6-1 to 6-n (except for the 6-k which is described below). And reading from the storage device 1 is done on the second buffer 6-k (corresponding to the video-audio data Drk) of which the second predicted consumption duration is below the second threshold value T2.

In case more than one of the second predicted consumption durations Ta1 to Tan are below the second threshold value T2, that is, there are a plurality of video-audio data with such second predicted consumption durations, then reading limiting means 14 bars the reading in the second buffer the video-audio data of which the second predicted consumption duration is not below the second threshold value T2. And the video-audio data with the second predicted consumption durations below the second threshold value T2 are read on the second buffer in the order of priority.

The arrangement just described guarantees that when the reading of a plurality of video-audio data is requested, the data requested will be read real-time in the preset order of priority. The order of priority may be the order in which files are opened or may be set in preparing files for specific video-audio data.

Embodiment 6

The present invention is also applicable in case a plurality of video-audio data are to be written and one video-audio data is to be read. The arrangement is the same as in the foregoing respective embodiments. That is, with a value larger than the maximum (longest) duration Tr required for reading from the storage device 1 the unit size Sr of data for one reading as the first threshold value T1, the second threshold value T2 is so preset that (T2−T1) is larger than the first maximum duration Tw required for writing in the storage device 1 the unit size Sw of data for one writing.

In case there are n pieces of first buffers 3-1 to 3-n, furthermore, the third threshold value T3 is so set that:

$$TS > n \times (TDS + Sw/Cw)$$

Figure 11:
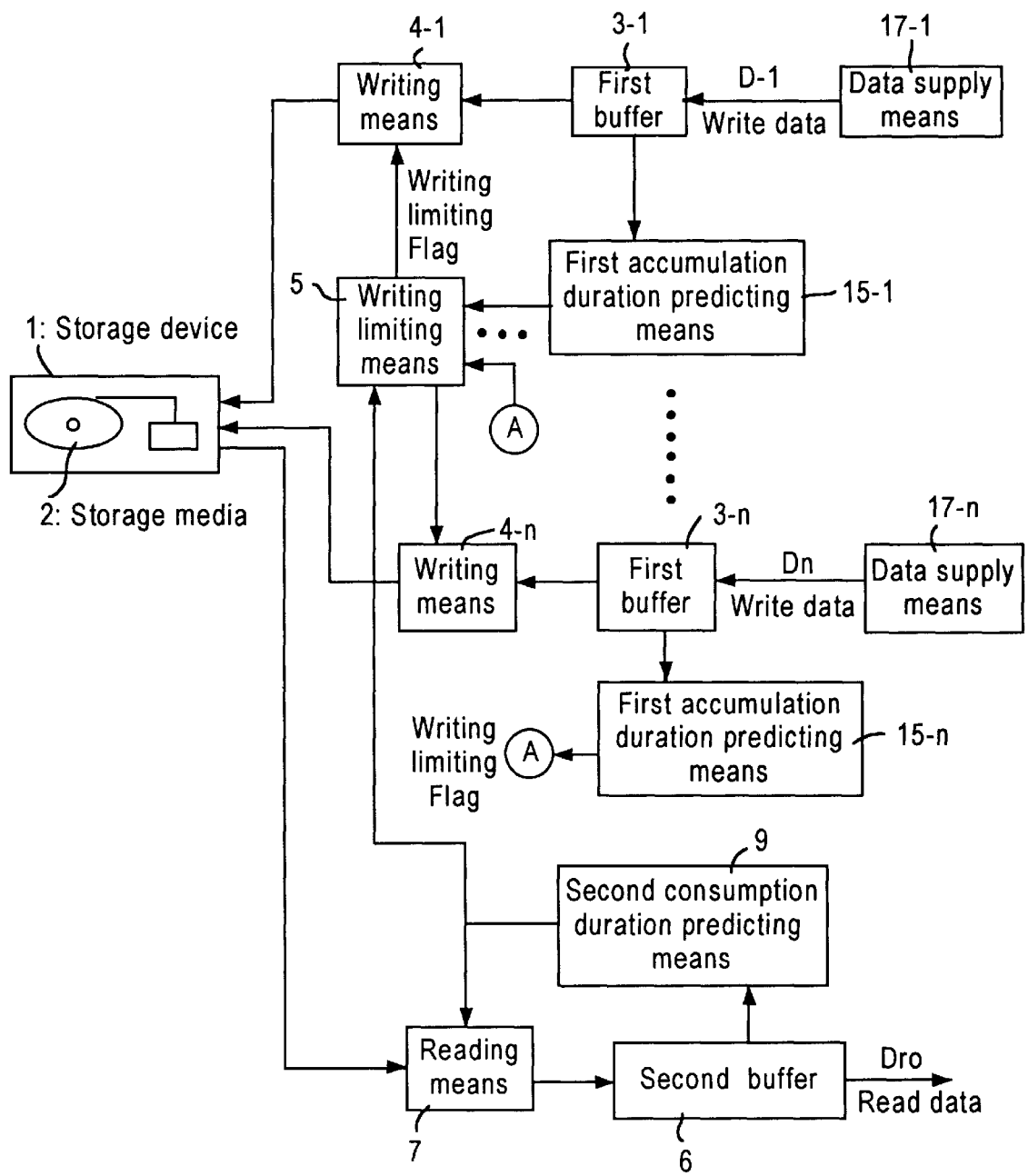
FIG. 11 is a block diagram showing an embodiment of the present invention in case there are a plurality of video-audio data to be written.

Let it be assumed that there are now a piece of video-audio data Dr0 to be read and n pieces of video-audio data Dw1–Dwn to be written. As shown in FIG. 11, the video-audio data Dr0 is referred to the second buffer 6 through reading means 7 and temporarily held therein before being sent out. It is furthermore so arranged that second consumption duration predicting means 9 works out the second predicted consumption duration as in the foregoing respective embodiments.

Meanwhile, the video-audio data Dw1–Dwn to be written are each temporarily retained in the first buffers 3-1 to 3-n as they are inputted from data supply means 17-1 to 17-n, and then written in the storage device 1 through writing means 4-1 to 4-n.

And there are provided first accumulated duration predicting means 15-1 to 15-n for the respective first buffers. First accumulated duration predicting means 15-1 to 15-n measure the amounts of data held in the first buffers 3-1 to 3-n. In addition, first accumulated duration predicting means 15-1 to 15-n receive information on the amounts of data supplied to the first buffers 3-1 to 3-n per unit period as accumulation rate from data supply means 17. Furthermore, first accumulated duration predicting means 15 predicts the durations t3-1 to t3-n that the first buffers 3-1 to 3-n become full—the first predicted accumulation duration—on the basis of the amounts of data currently held in the first buffers 3-1 to 3-n and notifies writing limiting means 5 of the results. Writing limiting means 5 bars writing means 4-1 to 4-n from writing data under the specific conditions described below.

Here, the following information is used as accumulation rate. That is, in case data supply means 17-1 to 17-n which supply the first buffers 3-1 to 3-n with data can give the first buffers 3-1 to 3-n information on the amounts of data that are inputted into the first buffers 3-1 to 3-n per unit period, first accumulated duration predicting means 15-1 to 15-n take information given from data supply means 17-1 to 17-n as accumulation rate. If data supply means 17-1 to 17-n can not give information on the amounts of data that are inputted into the first buffers 3-1 to 3-n per unit period, first accumulated duration predicting means 15-1 to 15-n take the preset values as accumulation rate.

The operation under that setup will now be described.

In case the second predicted consumption duration is below the second threshold value T2, data will be read from the storage device 1, while writing limiting means 5 bars writing means 4-1 to 4-n from writing data.

In case the second predicted consumption duration is not lower than the second threshold value T2, the following control will be effected.

Writing limiting means 5 has the video-audio data in the first buffers 3-1 to 3-n written in order of increasing predicted accumulation durations t3-1 to t3-n or a preset order.

Figure 12:
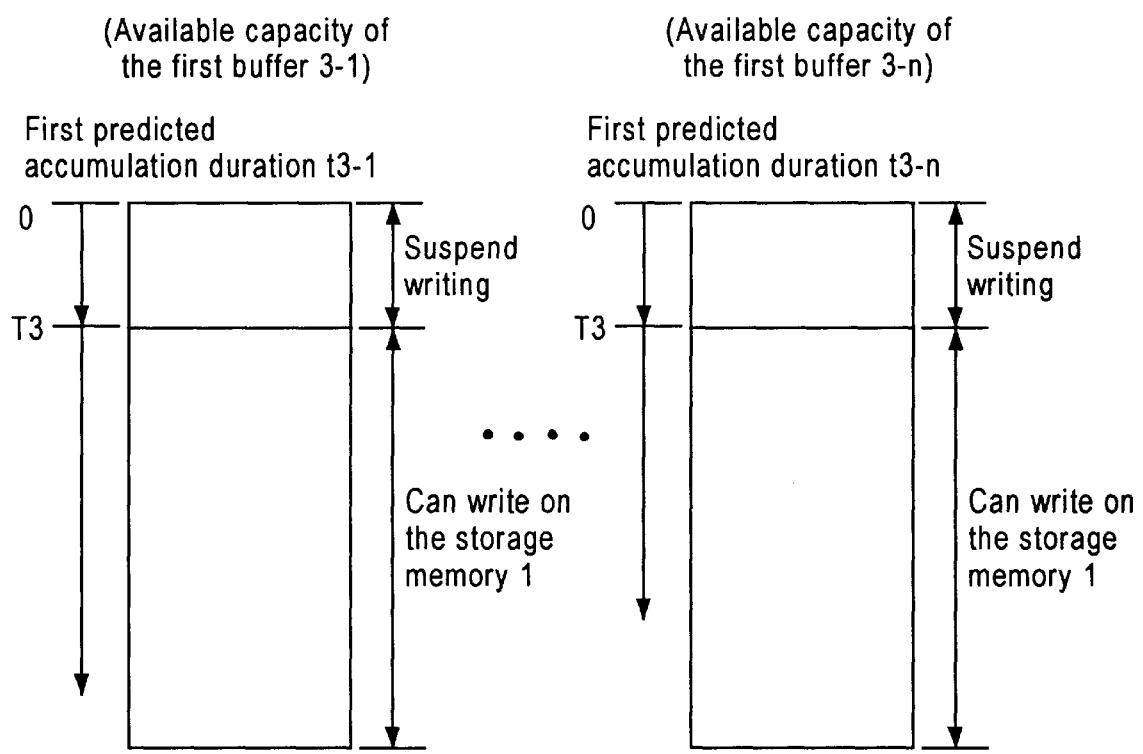
FIG. 12 is a conceptual diagram illustrating the relationship between the first predicted accumulation duraiton and writing prohibitions in FIG. 11.
Figure 13:
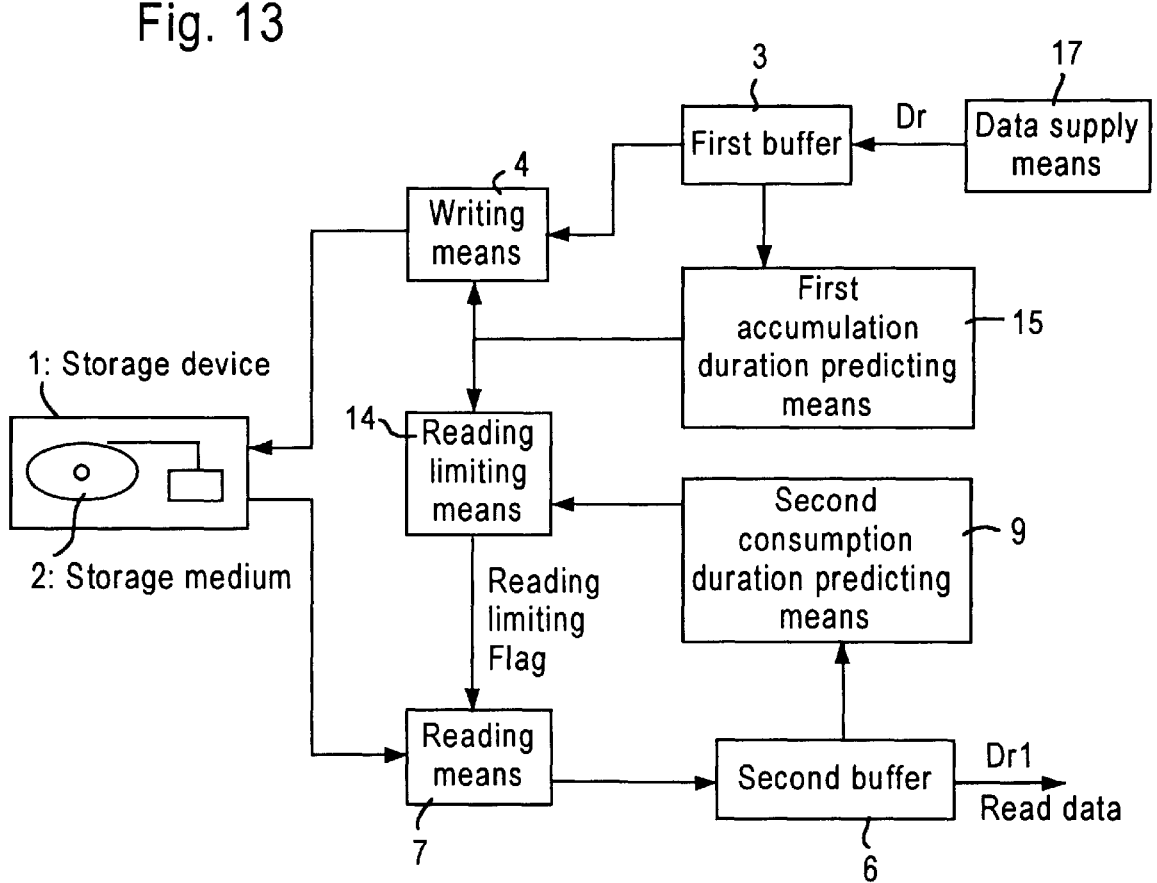
FIG. 13 is a block diagram illustrating an embodiment of the present invention in which the reading side is controlled.
Figure 14:
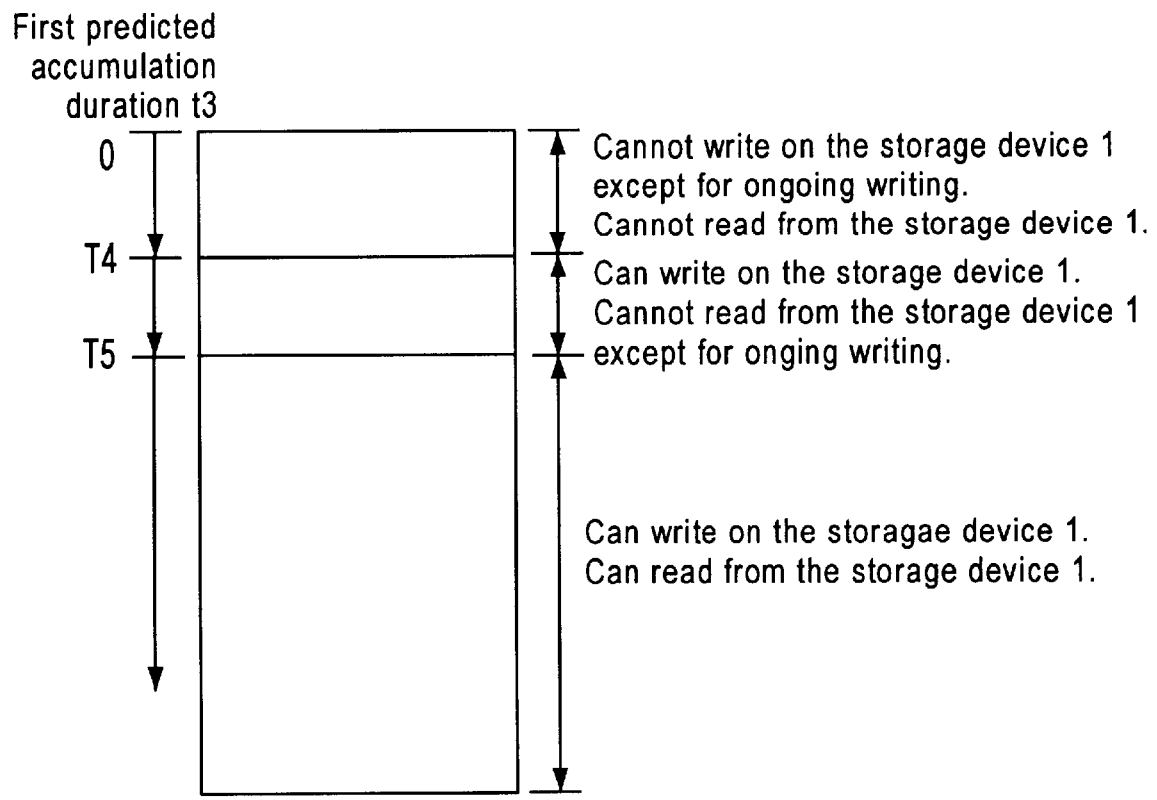
FIG. 14 is a conceptual diagram illustrating the relationship between the first predicted accumulation duration and writing prohibitions in FIG. 13.

But the writing in the storage device 1 is suspended in the first buffers 3-1 to 3-n where the first predicted accumulation duration is below the third threshold value T3 as shown in FIG. 12. It is noted that the order of priority is set on writing limiting means 5 by the user who is writing data.

As set forth above, suspending the writing ensures that video-audio data can be read real-time from the storage device 1 and that data can be written in the storage device 1 according to the state in the first buffer 3 or in order of priority numbers given to the video-audio data.

Embodiment 7

Control mainly on writing has been described. The present invention is also applicable to control on reading.

In the present embodiment, with a value larger than the first maximum duration Tw as the fourth threshold value T4, the fifth threshold value T5 is so set that (T5−T4) is larger than the second maximum duration Tr.

Let it be assumed that one video-audio data Dr1 is to be read and one video-audio data Dw2 is written. Video-audio data Dr1 to be read is read through reading means 7 and temporarily held in the second buffer 6 before being sent out from the second buffer 6 as in the foregoing embodiments. Second consumption duration predicting means 9 works out the second predicted consumption duration also as in the foregoing embodiments.

Meanwhile, video-audio data Dw2 to be read is first held in the first buffer 3 and written in the storage device 1 through writing means 4. Furthermore, reading limiting means 14 controls the operation of reading means 7 depending on the state in the following way. Still furthermore, first accumulated duration predicting means 15 predicts the first predicted accumulation duration on the basis of the amount of data per unit period held in the first buffer 3, that is, the accumulation rate.

The way of first accumulated duration predicting means 15 deciding on the accumulation rate in the above process is the same as in Embodiment 6.

Meanwhile, reading limiting means 14 monitors the first predicted accumulation duration and pulls up the write inhibit flag Fr when the first predicted accumulation duration is less than the fifth threshold value T5. Then, reading means 7 is bars from reading. If the first predicted accumulation duration is not lower than the fourth threshold value T4, the ongoing reading from the storage device 1 will be carried out but new reading will be prohibited.

In case the first predicted accumulation duration is less than the fourth threshold value T4, reading limiting means 14 directs reading means 7 to suspend reading data including the ongoing reading.

In case the first predicted accumulation duration is larger than the fifth threshold value T5, reading limiting means 14 pulls down the write inhibit flag Fr to lift the reading bar on reading means 7.

As set forth above, the arrangement of the present data output apparatus guarantees the writing of the video-audio data when video-audio data is being read and written with priority given to the writing.

It is noted that it is natural that the third embodiment may be provided with a plurality of second buffers 6's.

As set forth above, the present invention can ensure that if the data consumption duration in the reading buffer—the second buffer—decreases below a specific level while video-audio data is being read and written, the writing will be banned so that video-audio data may be read real-time.

In case a reproduction buffer is connected after or on the downstream side of the reading buffer, it is possible to accurately predict the consumption duration of data in the reading buffer by keeping a record of the history of send rates of video-audio data sent out from the reading buffer. Thus, it is ensured that the video-audio data as read are maintained real-time.

Even if a plurality of video-audio data to be read are present, video-audio data as they are read are kept real-time by barring the writing when the data consumption duration in the reading buffer corresponding to any one of those video-audio data falls below a specific level.

Also, even if a plurality of video-audio data are to be written, needless to say, real-time reading of video-audio data can be ensured by giving priority to the reading. Furthermore, the number of readings is prevented from increasing by banning the writing when the predicted accumulation duration for the writing buffer—the first buffer—is below a specific level even if writing is possible.

Still further, the present invention offers an advantage that writing is maintained real-time.

What is claimed is:

1. A data output apparatus for exclusively writing on a recording medium a data stream to be inputted and reading said data stream recorded on said recording medium to send said data stream to an external device,
    said data stream containing video-audio information compressed at a variable bit rate,
    said data output apparatus comprising:
        a first buffer for holding said inputted data stream;
        writing means for writing on said recording medium said data stream held in said first buffer;
        a second buffer for holding said data stream to be outputted to said external device;
        reading means for reading onto said second buffer said data stream held on said recording medium;
        predicting means for predicting duration to consume said data stream held on said second buffer on the basis of duration required for presentation of the video-audio information contained in said data stream held on said second buffer; and
        control means for controlling said writing means and said reading means, said control means gives a permit to said reading means to read said data stream from said recording medium onto the second buffer if the predicted duration is less than a threshold value.

2. The data output apparatus as defined in claim 1 wherein said control means further controls said writing means and said reading means in such a way as to curb the number of switchings between the writing and reading of said data stream on said recording medium.

3. The data output apparatus as defined in claim 2, wherein
    said control means gives a permit said writing means to write said data stream from the first buffer to said recording medium if the predicted duration is not less than the threshold value.

4. The data output apparatus as defined in claim 3, wherein
    said control means prohibits the writing of said data stream from the first buffer to said recording medium if the predicted duration is less than the threshold value.

5. The data output apparatus as defined in claim 1, wherein
    said data stream is a data stream of the MPEG formula and, said predicting means:
        acquires the time code value utilized for reproduction that is contained in the data stream of the MPEG formula held in said second buffer, and
        predicts the duration to consume said data stream held in the second buffer on the basis of said time code.

6. The data output apparatus as defined in claim 5, wherein
    said time code is a system clock reference in the pack header provided at the head of each pack forming the program stream of the MPEG formula.

7. The data output apparatus as defined in claim 5 wherein said time code is a system clock reference in the adaptation field at each transport packet forming a transport stream of the MPEG formula.

8. The data output apparatus as defined in claim 1, wherein
    said data stream is a data stream in which bit rate information at the duration of reproduction in blocks is recorded in the information field provided at the head in the respective blocks of said data stream, and
    said predicting means:
        acquires from said information field bit rate information at the time of reproduction in blocks of the data stream held in the second buffer,
        acquires the size of each block, and
        predicts the duration to consume said data stream held in the second buffer on the basis of said information on bit rate and said block size.

9. The data output apparatus as defined in claim 7 or 8, wherein
    there is additionally provided send rate detection means for detection of the amount of data per unit period to be sent from the second buffer, and
    said predicting means:
        predicts the duration to consume said data stream held in the second buffer on the basis of the history of the amounts of data per unit period sent out from the second buffer, the above amounts of data detected by said send rate detection means, and the history of the durations required for presentation of video-audio information contained in said data stream held in the second buffer.

10. A data output apparatus for writing on a recording medium a data stream to be inputted and reading and sending out said data stream recorded on said recording medium to an external device, said data stream containing video-audio information compressed at a variable bit rate, said data output apparatus comprising:
 a first buffer for holding said inputted data stream;
 writing means for writing on said recording medium said data stream held in said first buffer;
 a second buffer for holding said data stream to be outputted to said external device;
 reading means for reading onto said second buffer said data stream held on said recording medium;
 a memory holding a duration table where the offset values $b01, b02, \ldots, b0n$ of said data stream are linked to the times $a01, a02, \ldots, a0n$ for said data stream of said offset values $b01, b02, \ldots, b0n$ each to be reproduced;
 predicting means for predicting duration to consume said data stream held on said second buffer on the basis of duration required for presentation of the video-audio information contained in said data stream held on said second buffer, said predicting means measuring the amount of data sent out from said second buffer and the amount of data inputted in the second buffer, working out the top offset value $b0i$ and the last offset value $b0j$ of said data stream held in the second buffer on the basis of said amount of data sent out and the amount of data inputted, and acquiring the time $a0i$ corresponding to the offset value $b0i$ and the time $a0j$ corresponding to the offset value $b0j$, thereby working out said predicted duration $a0j\text{-}a0i$, and
 control means for controlling said writing means and said reading means,
 said writing means and said reading means writing or reading said data stream exclusively on said recording medium, and
 said control means controlling said writing means and said reading means on the basis of the predicted duration to consume said data stream to prevent said second buffer from underflow.

11. A data output apparatus for writing on a recording medium a data stream to be inputted and reading and sending out said data stream recorded on said recording medium to an external device, said data stream containing video-audio information compressed at a variable bit rate, said data output apparatus comprising:
 a first buffer for holding said inputted data stream;
 writing means for writing on said recording medium said data stream held in said first buffer;
 a second buffer for holding said data stream to be outputted to said external device;
 reading means for reading onto said second buffer said data stream held on said recording medium;
 a memory having a time table on which the durations "$a11\text{-}0$," "$a12\text{-}a11$," "$a13\text{-}a12$," $\ldots$ "$a1n\text{-}a1(n-1)$" are linked to the bit rates $r11, r12, r13 \ldots, r1n$ of the data stream at the respective durations;
 predicting means for predicting duration to consume said data stream held on said second buffer on the basis of duration required for presentation of the video-audio information contained in said data stream held on said second buffer, said predicting means measuring the amount of data sent out from said second buffer and the amount of data inputted in the second buffer, and working out the top offset value $a1i$ and the last offset value $a1j$ of said data stream held in the second buffer on the basis of said amount of data sent out and the amount of data inputted, thereby working out said predicted duration $a1j\text{-}a1i$, and
 control means for controlling said writing means and said reading means,
 said writing means and said reading means writing or reading said data stream exclusively on said recording medium, and
 said control means controlling said writing means and said reading means on the basis of the predicted duration to consume said data stream to prevent said second buffer from underflow.

* * * * *